Oct. 2, 1962  P. L. MICHEL ETAL  3,056,456
ROTOR HEAD FAIRING

Filed Jan. 27, 1960  2 Sheets-Sheet 1

INVENTORS
PHILIP L. MICHEL
EVAN A. FRADENBURGH

BY Jack N. McCarthy
AGENT

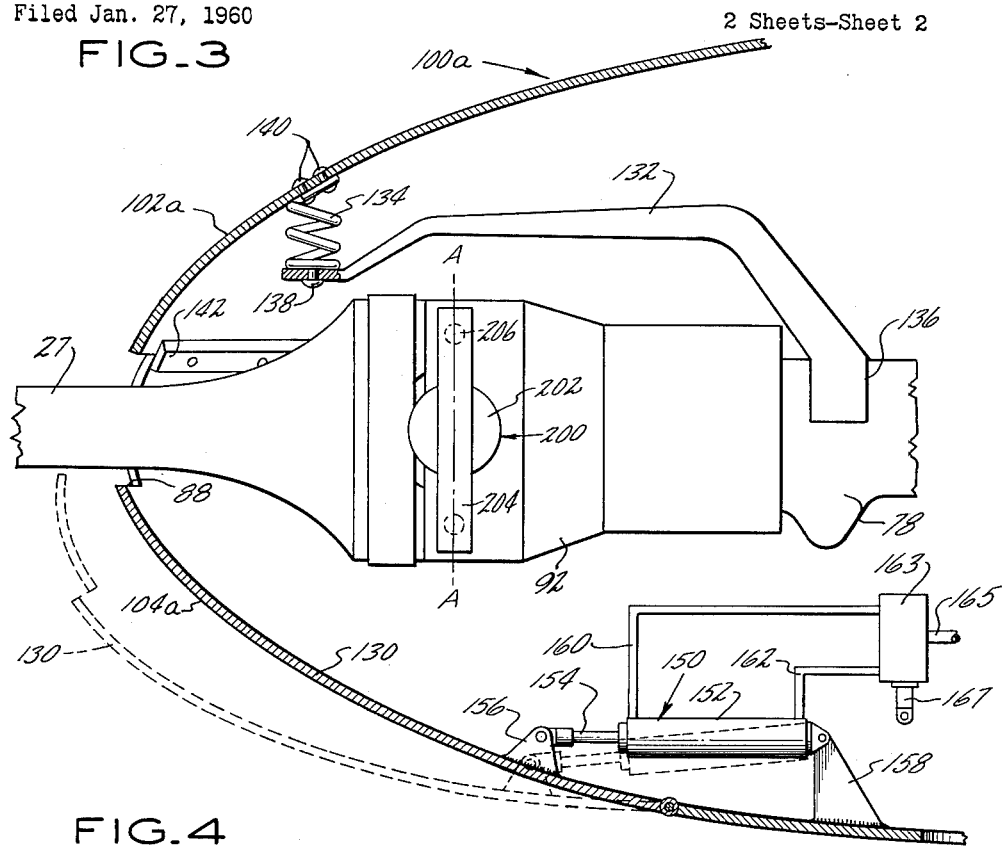
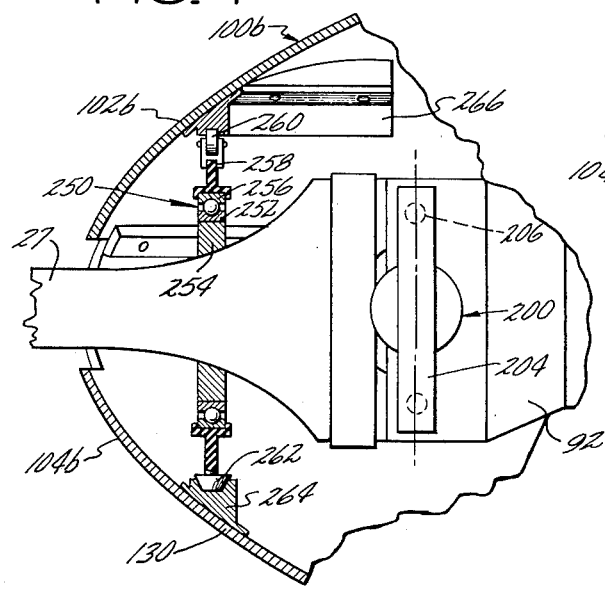
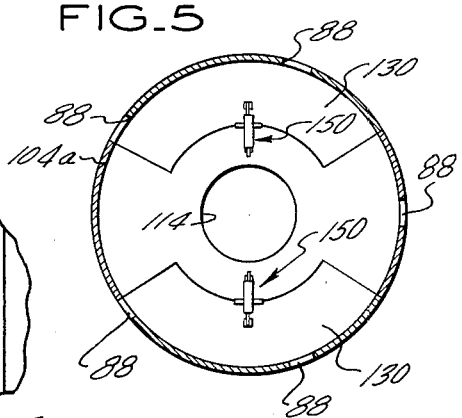
FIG_3
FIG_4
FIG_5
INVENTORS
PHILIP L. MICHEL
EVAN A. FRADENBURGH
BY Jack N. McCarthy
AGENT

United States Patent Office 3,056,456
Patented Oct. 2, 1962

3,056,456
ROTOR HEAD FAIRING
Philip L. Michel, Weston, and Evan A. Fradenburgh, Fairfield, Conn., assignors to United Aircraft Corporation, East Hartford, Conn., a corporation of Delaware
Filed Jan. 27, 1960, Ser. No. 4,920
14 Claims. (Cl. 170—159)

This invention relates to a fairing for a rotor head.

An object of this invention is to provide a rotor head, adapted to extend externally of an aircraft, with a fairing having a near optimum aerodynamic shape without having excessively large cutouts for blade motion.

Another object of this invention is to provide a fairing which will protect a rotor head including its associated operating mechanism against weather damage.

A further object of this invention is to provide a rotor head fairing which will improve the top speed capabilities of an aircraft and increase fuel economy.

Another object of this invention is to provide a rotor head fairing which will produce a reduction in drag of the rotor head.

A further object of this invention is to reduce turbulence behind the rotor head and thereby reduce aircraft vibrations.

Another object of this invention is to provide a rotor head fairing which is effectively attached to the blades rather than to the rotor head.

A further object of this invention is to provide a fairing which is resiliently mounted to the blades.

Another object of this invention is to provide a rotor head fairing which will permit folding of the blades.

A further object of this invention is to maintain a predetermined blade relationship and remove the possibility of ground resonance and minimize the need for blade dampers.

Another object of this invention is to provide a fairing which extends outboard of the flapping and lagging hinges of the rotor head.

Other objects and advantages will be apparent from the specification and claims, and from the accompanying drawings which illustrate an embodiment of the invention.

FIG. 3 is an enlarged view showing a modification of the rotor head fairing attaching means;

FIG. 4 is an enlarged view showing another modification of the rotor head fairing attaching means;

FIG. 5 is a sectional view showing the inside of the lower section of the rotor head fairing;

Figure 1:
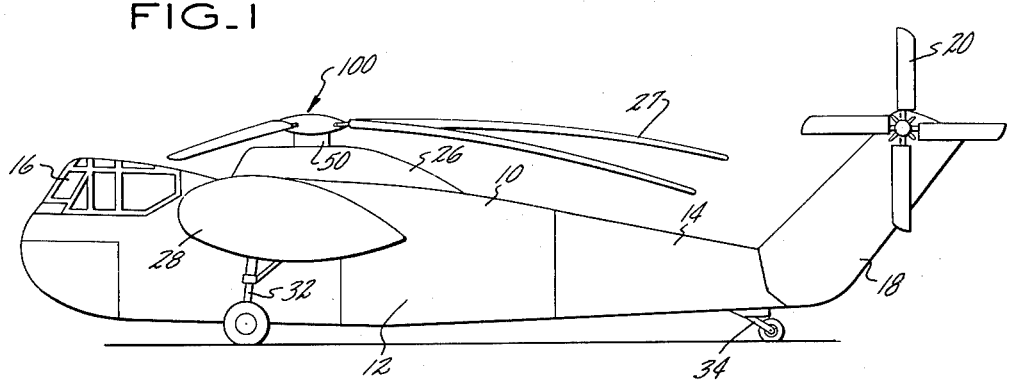
FIG. 1 is a side elevation of a helicopter embodying the invention.
Figure 2:
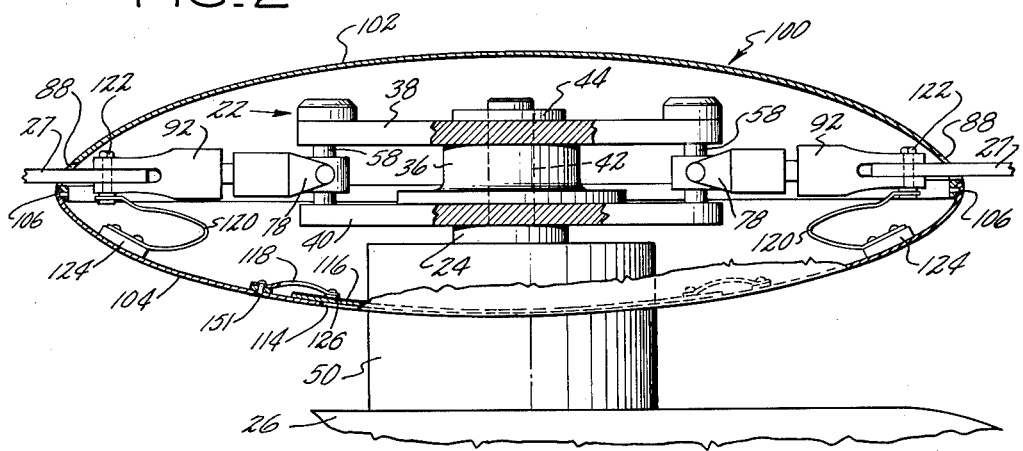
FIG. 2 is a sectional view of the rotor head fairing from the side showing its attachment to the blades of a rotor head.

Referring to FIG. 1, this figure shows a helicopter having a fuselage 10 including a cargo or passenger compartment 12 which extends from the nose of the ship aft into the tail cone 14. A pilot's compartment 16 is located above the cargo or passenger compartment. A tail rotor pylon 18 is also provided having the usual anti-torque tail rotor 20 mounted thereon for rotation. A main sustaining rotor 22 is mounted on an upright tubular shaft 24 which extends from the main rotor pylon 26 located just aft of the pilot's compartment.

Two engines are provided to drive the main and tail rotors, each mounted in a separate nacelle 28, one of which is shown in FIG. 1. These nacelles are carried by stub wings projecting laterally from opposite sides of the fuselage. The usual main and auxiliary landing gear, 32 and 34, are provided for supporting the ship on the ground.

The rotor head 22 which is mounted on the tubular shaft 24 is shown schematically and without actuating means for the blades. Rotor heads and actuating systems which may be used are shown in U.S. Patent No. 2,638,994 and U. S. Patent No. 2,672,940. The rotor head 22 shown has an upper plate 38 spaced from a lower plate 40 by a spacer member 36. Tubular shaft 24 has a necked-down portion 42 which extends through the center of the rotor head. A large nut 44 is threadably secured to the top of the necked-down portion 42 of the shaft 24 to fixedly secure the rotor head to the shaft. A drag hinge 58 is mounted between the upper and lower plates 38 and 40 for each blade. A flapping hinge 78 is pivotally mounted to each drag hinge to provide flapping movement for each blade. A blade attaching sleeve 92 is journalled to the free end of each flapping hinge so that each blade will be permitted a pitch changing movement. Each blade 27 is fixed to its sleeve 92 by a bolt 122.

While no actuating means are shown, push-pull control rods and associated mechanism can extend from the fuselage of the aircraft through the main rotor pylon 26 and control system enclosure cylinder 50. A rotor head fairing 100 encloses the rotor head 22 and is supported by blades 27.

The rotor head fairing 100 includes an upper section 102 and a lower section 104. The two sections are fixed together where they meet by a plurality of screws 106.

The rotor head fairing is supported entirely by rotor blades through a substantially U-shaped wire or leaf spring 120. One end of the leaf spring is attached to its respective blade by bolt 122 while the other end is fixed to the lower portion of the fairing by a block 124. Openings 88 are provided in the fairing to permit each blade to pass therethrough. Each opening permits a certain degree of movement for its blade before the blade contacts the fairing. The fairing may be formed out of sheet metal or fiberglass or any other suitable material known having the properties necessary. In flight, each blade needs only a small degree of movement relative to the other blades.

Figure 7:
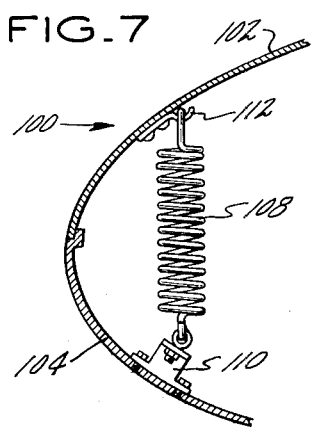
FIG. 7 is an enlarged view of a spring device for holding the top and bottom of a rotor head fairing together.

Other means for holding the upper and lower portions of the rotor head fairing 100 together may be used. One of these means is shown in FIG. 7. A plurality of springs 108 are connected between a plurality of sets of brackets. A set of brackets comprises a bracket 110 fixed to the lower section 104 and a bracket 112 fixed to the upper portion 102. It may not be necessary to connect the fairing to all of the blades, a plurality which would give proper support is all that is needed. The number of blade connections could vary between aircraft.

A large opening 114 is provided in the lower portion 104 of the rotor head fairing 100 to provide for tilting movement of the rotor head fairing. To seal the rotor head fairing with the control system enclosure cylinder, an annular disk 116 is placed inside of the rotor head fairing with its inner circumference just fitting around the outer circumference of the control system enclosure cylinder. A plurality of leaf springs 118 are spaced around the cylinder. Each leaf spring has one end fixed to the lower portion 104 of the rotor head fairing at 151 which is at a distance spaced away from the outer circumference of the disk 116, to permit movement of the fairing without binding on the cylinder, while the free end exerts a pressure downwardly on the disk. A bearing member 126 is fixed to the free end of each leaf spring 118 to contact disk 116. Other seals may be used such as a rubber seal between the edge of opening 114 and the cylinder 50.

Mounting the fairing to the blades by a flexible or spring mount provides a positive centering action on the blades relative to the cutout openings or holes 88, so that changes in tip path plane or mean lag angle would be followed by the fairing without contact between the blades and the edges or the rims of the openings 88. Since the fairing is connected to the blade, the size of the flexible mounting is minimized.

FIG. 3 shows a modification of the motor head fairing and rotor head fairing supporting means. This rotor head fairing 100a includes an upper section 102a and lower section 104a. The lower section has its upper end extending past the midway point along the fairing and has the openings 88 formed therein for permitting movement of the blade with respect to the fairing. In this modification, doors 130 are provided to permit the blades to fold about their hinge axis A—A.

The upper section 102a is attached to the flapping hinge 78 of each blade by an arm 132 and spring 134. Each arm 132 is fixedly mounted to a flapping hinge 78 at 136 and extends radially outwardly over the top of its cooperating blade sleeve 92 and blade 27. A coil spring 134 has its lower end fixedly attached by a bolt 138 to the free end of the arm 132 and has its upper end fixed to the upper section 102a by a pair of bolts 140. While a coil spring has been shown with a bolt attaching means, other types of resilient mounts may be used along with other well-known attaching means.

A lip or flange 142 extends downwardly from the inner edge of the upper section 102a to mate with the inner side of the upper edge of the lower section 104a. The forward and rearward portions of the lower section 104a are fixedly mounted to the forward and rearward portions of the upper section 102a by bolts or any other equivalent type fixing means (see FIG. 5).

Means for actuating each door 130 includes a cylinder and piston unit 150. The unit comprises a cylinder 152 having a moveable piston therein with a piston rod 154 extending therefrom. The free end of the piston rod 154 is attached to a bracket 156 fixed to the inside of its cooperating door and the free end of cylinder 152 is pivotally attached to a cooperating bracket 158 fixed to the bottom of the lower section 104a.

A fluid can be directed to one end of the cylinder or the other through conduits 160 or 162, while connecting the other conduit to drain, to move the piston within the cylinder and thereby open or close the door by a power actuator 163. This actuator can be a servo valve for directing a motive fluid to one end of a piston or the other while connecting the opposite end to drain. A motive fluid can be directed to the valve by a conduit 165. Actuator 163 can be manually operated by the pilot by a member 167 or may be integrated into an automatic means of folding rotor blades such as shown in U.S. Patent No. 2,925,130.

Figure 6:
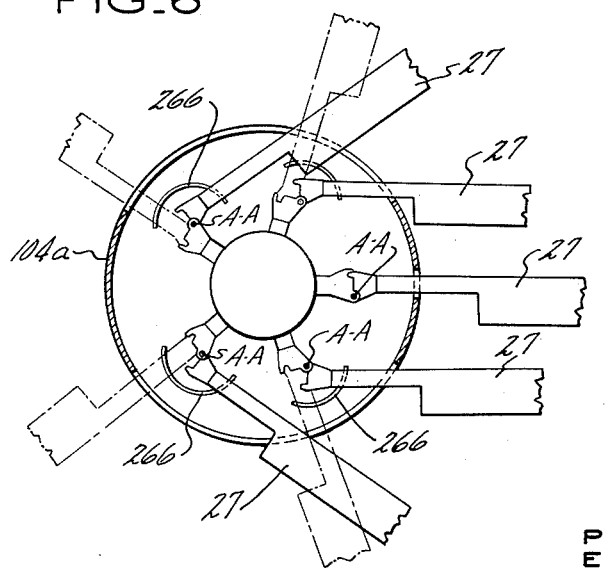
FIG. 6 is a schematic view showing one form of blade folding. Tracks such as would be used with the modification shown in FIG. 4 are shown.

FIG. 5 shows the doors in their closed position with openings 88 spaced to receive each blade passing therethrough. FIG. 6 shows the blades in solid lines in a folded position with the doors in an open position.

While each blade is pivotally mounted on an axis A—A for folding movement on its blade sleeve, it is releasably held at another point by a locking device 200. This device comprises an actuator 202 which is attached to its cooperative blade sleeve which has a plate 204 with a pin 206 on each end which is adapted to extend through a portion of the blade sleeve 92 and blade 27. In one position, the actuator places the pins 206 in such a position so as to hold the blade and sleeve together, and in another position the actuator places the pins 206 in a position so that the blade is permitted to hinge about its axis A—A. A specific type of blade actuating and holding means is shown in Patent No. 2,925,130, cited above.

FIG. 4 shows another modification of the rotor head fairing and rotor head fairing support means. This rotor head fairing 100b includes an upper section 102b and lower section 104b. This modification is similar to that of FIG. 3 except for the rotor head fairing supporting means. Each blade 27 has a bearing unit 250 fixed thereto adjacent its root. The inner ring 252 of the bearing unit is connected to the blade by rigid arms 254. This connection may be by a plate if desired. The outer ring 256 has a flexible diaphragm 258 fixed to its outer edge which extends outwardly therefrom. This flexible diaphragm is relatively stiff. A roller 260 is attached to the top of the diaphragm 258 over the midpoint of the blade 27. A member 262 shaped as a frustum of a cone extends downwardly from a point below the midpoint of the blade 27. When the upper and lower sections 102b and 104b are in position with the doors 130 closed, a mating portion 264 engages member 262 to fix the fairing with respect to the blades. When the doors 130 are opened, the blades 27 are permitted to be moved to their folded position with the rollers 260 following individual track units 266. In FIG. 6, the relative positions of each track 266 are shown with respect to the rotor fairing.

On the ground with the rotor stopped, it is ordinarily possible for the blades to go completely out of pattern without a fairing 100 because of wind action on the blades. To avoid this difficulty, lag damping means can be used which would be capable of being locked when the rotor is in a stopped position or adequate structural strength could be built into the fairing to resist the forces on the blade. This structural strength could include the addition of an adequate material fixed around the edge of each opening 88.

It is to be understood that the invention is not limited to the specific description above or to the specific figures, but may be used in other ways without departure from its spirit as defined by the following claims.

We claim:

1. In combination in an aircraft, a rotor head, means mounting said rotor head for rotation, rotor blades, means connecting each of said blades to said rotor head, a rigid fairing enclosing said rotor head, said fairing having an opening for each blade and its connecting means mounted on said rotor head, and resilient means connected between a plurality of said blades and their connecting means and said fairing for supporting said fairing, said resilient means providing for relative movement between said fairing and said rotor head.

2. In combination in an aircraft, a rotor head, means mounting said rotor head for rotation, rotor blades, means connecting each of said blades to said rotor head, a rigid fairing enclosing said rotor head, said fairing having an opening for each blade and its connecting means mounted on said rotor head, and resilient means connected between a plurality of said blades and their connecting means and said fairing for supporting said fairing, said resilient means providing for relative movement between said fairing and said rotor head, said resilient means comprising a spring.

3. In combination in an aircraft, a rotor head, means mounting said rotor head for rotation, rotor blades, means connecting each of said blades to said rotor head, a rigid fairing enclosing said rotor head, said fairing having an opening for each blade and its connecting means mounted on said rotor head, and resilient means connected between a plurality of said blades and their connecting means and said fairing for supporting said fairing, said resilient means providing for relative movement between said fairing and said rotor head, said fairing maintaining said blades in a predetermined relationship.

4. In combination in an aircraft, a rotor head, means mounting said rotor head for rotation, rotor blades, means connecting each of said blades to said rotor head, a rigid fairing enclosing said rotor head, said fairing having an opening for each blade and its connecting means mounted on said rotor head, and means mounting said fairing with respect to said blades so that the fairing is movable with relation to said rotor head and adjusts itself to a position correlated to the tip path plane of the rotor.

5. In combination in an aircraft, a rotor head, means mounting said rotor head for rotation, rotor blades, means connecting each of said blades to said rotor head, each of said connecting means including a flapping hinge, a rigid fairing enclosing said rotor head and flapping hinges, said fairing being formed as a streamlined body, said fairing having an opening for each blade mounted on said rotor head, and means mounting said fairing with respect to said blades so that the fairing adjusts itself to a position correlated to the tip path plane of the rotor.

6. In combination in an aircraft, a rotor head, means mounting said rotor head for rotation, a plurality of blades, means connecting each of said blades to said rotor head, a rigid fairing enclosing said rotor head, said fairing being formed as a streamlined body, said fairing comprising an upper section and lower section, means fixing one section of said fairing to the other, said fairing having an opening for each blade and its connecting means mounted on said rotor head, means mounting said fairing to the blades of said rotor head for movement therewith, said last-named mounting means providing the main support for said fairing.

7. In combination in an aircraft, a rotor head, means mounting said rotor head for rotation, rotor blades, means connecting each of said blades to said rotor head, each of said connecting means including a flapping hinge, a rigid fairing enclosing said rotor head and flapping hinges, said fairing being formed as a streamlined body, said fairing having an opening for each blade mounted on said rotor head, and resilient means on a plurality of said blades for supporting said fairing.

8. In combination in an aircraft, a rotor head, means mounting said rotor head for rotation, rotor blades, means connecting each of said blades to said rotor head, each of said connecting means including a flapping hinge, a rigid fairing enclosing said rotor head and flapping hinges, said fairing being formed as a streamlined body, said fairing having an opening for each blade mounted on said rotor head, and resilient means connected between a plurality of said blades and said fairing for supporting said fairing, said resilient means being connected to said blades outboard of their flapping hinges.

9. In combination in an aircraft, a rotor head, means mounting said rotor head for rotation, rotor blades, means connecting each of said blades to said rotor head, each of said connecting means including a flapping hinge, a rigid fairing enclosing said rotor head and flapping hinges, said fairing being formed as a streamlined body, said fairing having an opening for each blade mounted on said rotor head, arms extending radially outwardly from a plurality of flapping hinges, each arm extending over each cooperating blade, and resilient means connecting each free end of each arm to said fairing for supporting it.

10. In combination in an aircraft, a rotor head, means mounting said rotor head for rotation, rotor blades, means connecting each of said blades to said rotor head, each of said connecting means including a flapping hinge, each of said connecting means including blade pitch changing means between each blade and its flapping hinge, a rigid fairing enclosing said rotor head and connecting means, said fairing being formed as a streamlined body, said fairing having an opening for each blade mounted on said rotor head, arms extending radially outwardly from a plurality of flapping hinges, each arm extending over each pitch changing means of each cooperating blade, and resilient means connecting each free end of each arm to said fairing for supporting it.

11. In combination in an aircraft, a rotor head, means mounting said rotor head for rotation, rotor blades, means connecting each of said blades to said rotor head, each of said connecting means including a flapping hinge, a rigid fairing enclosing said rotor head and flapping hinges, said fairing being formed as a streamlined body, said fairing having an opening for each blade mounted on said rotor head, an annular bearing for each of a plurality of blades having an inner and outer ring, means fixing each inner ring to its respective blade, and resilient means connecting each outer ring to said fairing.

12. In combination in an aircraft, a rotor head, means mounting said rotor head for rotation, rotor blades, means connecting each of said blades to said rotor head, each of said connecting means including a flapping hinge, a rigid fairing enclosing said rotor head and flapping hinges, said fairing being formed as a streamlined body, said fairing having an opening for each blade mounted on said rotor head, an annular bearing for each of a plurality of blades having an inner and outer ring, means fixing each inner ring to its respective blade, resilient means connected to each outer ring, first means connecting the top of said resilient means to said fairing, and second means connecting the bottom of said resilient means to said fairing.

13. In combination in an aircraft, a rotor head, means mounting said rotor head for rotation, said rotor head having a plurality of blades extending therefrom, a rigid fairing enclosing said rotor head, said fairing being formed as a streamlined body, said fairing comprising an upper section and lower section, means fixing one section of said fairing to the other, said fairing having an opening for each blade mounted on said rotor head, means mounting said fairing to the blades of said rotor head providing for relative movement between said fairing and said rotor head, and doors located in said fairing so that blades may move between a flight position and folded position.

14. In combination in an aircraft, a rotor head, means mounting said rotor head for rotation, said rotor head having a plurality of blades extending therefrom, a rigid fairing enclosing said rotor head, said fairing being formed as a streamlined body, said fairing comprising an upper section and lower section, means fixing one section of said fairing to the other, said fairing having an opening for each blade mounted on said rotor head, means mounting said fairing to the blades of said rotor head providing for relative movement between said fairing and said rotor head, doors located in said fairing so that blades may move between a flight position and folded position, and means for actuating said doors.

References Cited in the file of this patent

UNITED STATES PATENTS

| | | |
|---|---|---|
| 1,989,544 | Campbell | Jan. 29, 1935 |
| 2,068,617 | Wilford et al. | Jan. 19, 1937 |
| 2,210,190 | Stanley | Aug. 6, 1940 |
| 2,405,777 | Buivid | Aug. 13, 1946 |
| 2,749,994 | Apostolescu | June 12, 1956 |

FOREIGN PATENTS

| | | |
|---|---|---|
| 931,198 | France | Sept. 29, 1947 |